(12) United States Patent
Aurnhammer et al.

(10) Patent No.: US 8,843,237 B2
(45) Date of Patent: Sep. 23, 2014

(54) METHOD AND DEVICE FOR CONTROLLING A MANIPULATOR

(75) Inventors: Andreas Aurnhammer, Munich (DE); Stefan Burkhart, Dillingen (DE); Manfred Huttenhofer, Meitingen (DE); Martin Weiss, Margertshausen (DE)

(73) Assignee: KUKA Laboratories GmbH, Augsburg (DE)

( * ) Notice: Subject to any disclaimer, the term of this patent is extended or adjusted under 35 U.S.C. 154(b) by 545 days.

(21) Appl. No.: 12/903,769

(22) Filed: Oct. 13, 2010

(65) Prior Publication Data

US 2011/0087375 A1      Apr. 14, 2011

(30) Foreign Application Priority Data

Oct. 13, 2009  (DE) .......................... 10 2009 049 172

(51) Int. Cl.
*B25J 9/16*          (2006.01)
*G05B 19/416*     (2006.01)

(52) U.S. Cl.
CPC .... *G05B 19/416* (2013.01); *G05B 2219/43058* (2013.01); *G05B 2219/45065* (2013.01); *G05B 2219/43057* (2013.01); *G05B 2219/45013* (2013.01); *G05B 2219/40057* (2013.01); *G05B 2219/40454* (2013.01); *G05B 2219/45238* (2013.01); *G05B 2219/40453* (2013.01); *G05B 2219/43062* (2013.01); *G05B 2219/43203* (2013.01); *Y10S 901/01* (2013.01)
USPC ............................................... 700/262; 901/1

(58) Field of Classification Search
USPC ..................... 700/262; 318/567, 569, 568.21, 318/568.11–568.18, 574; 901/1–3, 9, 10, 901/14, 19, 20
See application file for complete search history.

(56) References Cited

U.S. PATENT DOCUMENTS

| 5,373,221 A  | * | 12/1994 | McGee et al. ............ 318/568.11 |
| 6,278,253 B1 | * | 8/2001  | Hong ........................ 318/568.13 |
| 6,317,651 B1 | * | 11/2001 | Gerstenberger et al. ...... 700/245 |
| 6,643,563 B2 | * | 11/2003 | Hosek et al. ................... 700/245 |
| 7,292,910 B2 | * | 11/2007 | Gmeiner ....................... 700/245 |
| 2003/0014156 A1 |  | 1/2003 | Hashimoto et al. |

FOREIGN PATENT DOCUMENTS

| EP | 0507980 A1    | 10/1992 |
| EP | 1 117 020 A2  | 7/2001 |
| WO | 2008125656 A1 | 10/2008 |

OTHER PUBLICATIONS

Pfeiffer, F.; Reithmeier, E., Roboterdynamik. Eine Einführung in die Grundlagen und technischen Anwendungen. Stuttgart, B. G. Teubner 1987. XIV, 271 S., DM 34,—ISBN 3-519-02077-7 (Teubner Studienbücher Mechanik).

European Patent Office; Search Report in European Patent Application No. 10 01 0212 dated Nov. 19, 2010; 5 pages.

* cited by examiner

*Primary Examiner* — Dalena Tran
(74) *Attorney, Agent, or Firm* — Wood, Herron & Evans, LLP

(57) ABSTRACT

A method according to the invention for controlling a manipulator, in particular a robot, includes the following steps:
determining (S10, S20) a target path (q(s)) of the manipulator, and
determining (S70) a motion value (v(s)) for this target path, optionally, determining (S50) a path segment ([s_A, s_E]) with a defined profile of a motion value (v(s)=vc), and automatically determining (S60) this motion value on the basis of motion values (v_max_RB, v_max_vg) permissible in this path segment.

15 Claims, 1 Drawing Sheet

METHOD AND DEVICE FOR CONTROLLING A MANIPULATOR

Figure 1:
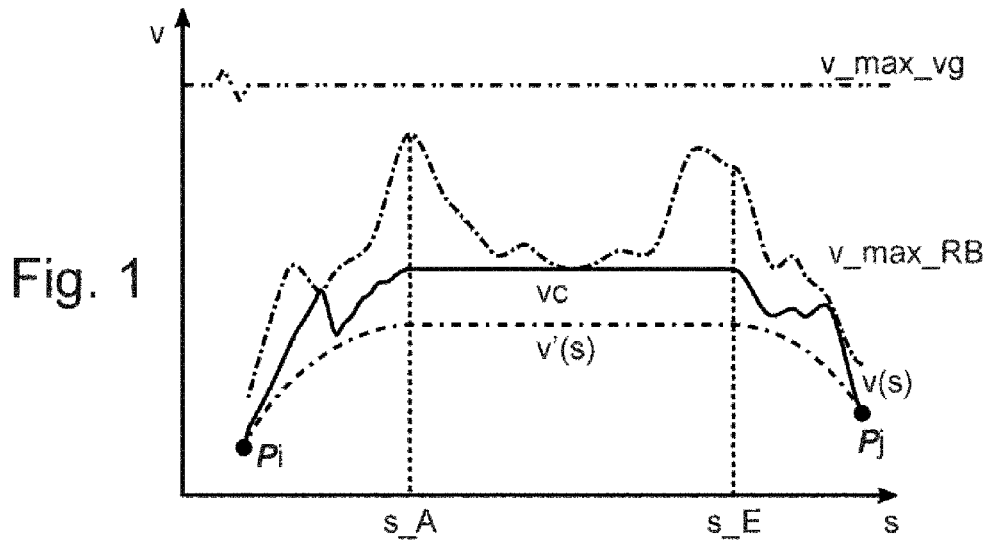

The present invention relates to a method and a device for controlling a manipulator, in particular a robot, wherein a target path of the manipulator and a motion value for this target path are determined.

In particular with industrial robots it is known, for example from EP 1 117 020 B1, to specify a target path as sequences of robot poses to be moved to by teaching or offline programming, which are interpolated using spline functions, i.e., polynomials defined area by area.

A method is known for example from F. Pfeiffer and E. Reithmeier, *Roboterdynamik* ("*Robot Dynamics*"), Teubner 1987, for determining an optional velocity profile for such a target path on the basis of a dynamic model of the robot while adhering to restrictions for axis or TCP velocities and motor moments. In particular, an efficient method for determining time-optimal velocity profiles is described under which the robot traverses the predefined target path as rapidly as possible while making full use of its drive limitations and while maintaining an upper limit for the Cartesian velocity of its TCP.

On the other hand, some work processes require that a velocity profile be defined along the target path. For example, if a robot is supposed to apply adhesive uniformly using an adhesive pistol with a constant adhesive delivery rate, this requires that the planned gluing path be traversed at a constant velocity. But when this constant velocity is chosen manually, the potential of the robot is normally not fully utilized.

The object of the present invention is therefore to improve the control of a manipulator.

To control a manipulator, in particular a robot, according to the invention a target path of the manipulator is determined. To this end for example positions, i.e., locations and/or orientations of a reference point or system that is fixed in relation to the manipulator, in particular of the tool reference system (tool center point, TCP), may be defined in the workspace, and/or joint coordinates, in particular joint or motor angles, may defined in the joint coordination space (configuration space) by moving to them ("teaching") or offline, for example on the basis of workpiece data such as the contour of a component to be worked on, from which an interpolator generates the continuous or discretized target path, for example in functional or table form. Preferably, in that process the target path is determined on the basis of spline functions, at least for some areas, making it possible to achieve multiply continuous transitions with appropriately low vibration excitations. In the same way, the target path can also be determined directly through off-line programming, for example by specifying appropriate functions in the working and/or configuration space that are parameterized via a path parameter.

One or more motion values are determined for this target path, in advance or during operation. A motion value may include in particular a velocity, acceleration and/or higher derivative of the reference point or reference system and/or of one or more axes of motion of the manipulator over time. For example, it is possible in particular to define a velocity profile along the target path, which a manipulator control can then implement by means of appropriately timed feed regulation or the like. Based on the integral or differential relationship, it is also equally possible to define an acceleration profile or jerk profile, i.e., the course of the third derivative of the coordinates over time, if this is more appropriate for example for the process to be worked through.

In this process, according to the invention optionally one or even more path segments are now determined, each with a defined profile of a motion value, and this motion value is determined automatically on the basis of motion values that are permissible in that path segment. In this way the manipulator can for example realize the desired velocity profile and at the same time on the other hand likewise adhere to restrictions such as maximum permissible TCP or axis speeds, torque limitations and the like.

The defined profile of the motion value is preferably determined qualitatively. It may for example be linear, in particular constant. It may be specified for example for a particular path segment that the velocity or acceleration of the TCP in the corresponding path segment should be constant or should rise or fall in a straight line.

This motion value is then automatically determined quantitatively in such a way that certain permissible motion values, for example permissible TCP and/or axis speeds and/or accelerations, drive torques or the like, are not exceeded or undershot. In particular, the automatically determined motion value may be an extreme, i.e., a minimum or maximum of the motion values permitted within the path segment, and may determined for this purpose for example on the basis of the minimum of maximum motion values permitted in the path segment and/or of the maximum of minimum motion values permitted in the path segment.

For example, maximum axis speeds, accelerations, jerks or the like may be predefined for the individual axes. Then, a maximum permissible Cartesian TCP velocity may be determined on the basis of these permissible motion values, using a kinematic model. In addition or alternatively, maximum drive torques, i.e., engine and transmission torques or the like, may be predefined for the individual axes. Then, a maximum permissible Cartesian TCP acceleration can be determined on the basis of these permissible motion values, using a dynamic model.

If it is now specified for example for a path segment that the velocity should be constant there, an optimizer can calculate the lowest of the previously explained maximum permissible TCP velocities or the lowest of the TCP velocities achievable with the previously explained maximum permissible TCP accelerations, as the automatically determined velocity. The manipulator then travels in the chosen path segment at the maximum constant velocity that is permissible based on all the restrictions regarding the drive speeds, drive accelerations, drive torques, etc.

The motion value determined for the target path, the motion value whose profile is predefined, and/or motion values considered during automatic determination of the latter, may include the same values. For example, a constant TCP velocity profile may be predefined qualitatively for a path segment, the constant velocity may be quantitatively determined automatically on the basis of the maximum permissible TCP velocity in this segment, and on the basis of this maximum constant TCP velocity the TCP velocity profile along the target path may be defined.

In the same way, two or three of the named motion values may also include differing values. For example, a constant TCP velocity profile may be predefined qualitatively for a path segment, the constant velocity may however be quantitatively determined automatically on the basis of the maximum permissible axis accelerations in this segment, and on the basis of this maximum constant TCP velocity the axis speed profile along the target path may be defined.

Designated in particular as the dynamic model of the manipulator is its mathematical description in the form of motion equations, for example for the joint coordinates q in the form $Md^2q/dt^2 + h(q, dq/dt) = \tau$, where M is the mass matrix, h is the force vector, and τ is the vector of the drive moments. It includes in particular a kinematic model of the manipulator, which describes the position of the TCP for example depending on the joint coordinates q and a path parameter s.

In a preferred embodiment, a path segment may be defined by points on the target path, it being possible preferably for offsets from these points to be defined. For example, if a gluing path is defined by starting and ending positions in the workspace, these points may be used, preferably allowing for an offset along the gluing path, to define the segment of the gluing path in which the TCP is to proceed at a constant velocity in order to guarantee a uniform application of adhesive. The input of the path segment may thus include both the information that a motion value profile is defined, and also the information about where this profile is to extend.

Because of the permissible motion values taken into account according to the invention when automatically determining the motion value, it may occur that the automatically determined motion value does not reach a desired quantitative value. For example, a user may want the manipulator to always travel at the maximum permissible velocity, for example 250 mm/s, in areas for which he specifies a constant TCP velocity. This is not always possible however, due to drive limitations. According to the invention, the maximum permissible constant velocity for example is then determined. It can then be beneficial to inform the user that the automatically determined constant velocity deviates from the predefined maximum velocity in that path segment. Preferably this output is rendered only optionally, for example only in a set-up mode, since it does not represent an error in automatic operation, but is traveled intentionally at the maximum constant velocity still possible due to restrictions.

In addition to or alternatively to determining a minimum or maximum motion value within the path segment, the motion value for the target path outside of the path segment may be optimized on the basis of reliable motion values. For example, when approaching or leaving a gluing section the manipulator may travel with a variable, time-optimal velocity profile.

Figure 2:
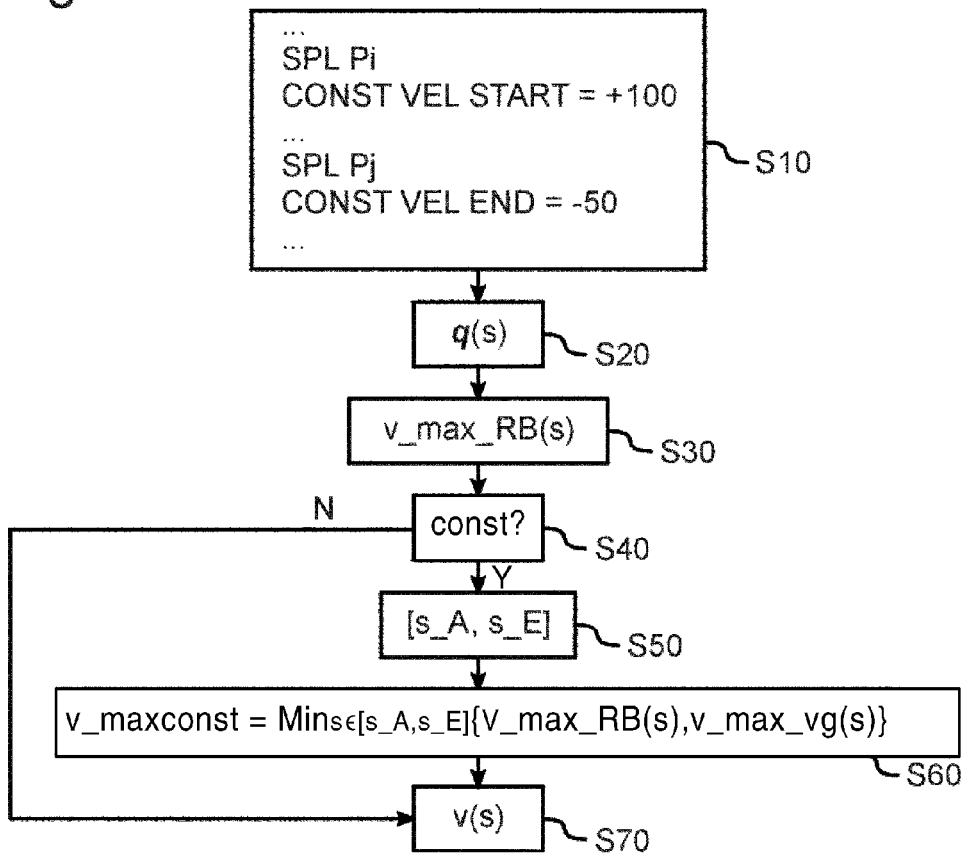

Additional advantages and features result from the subordinate claims and the exemplary embodiments. To this end the drawing shows the following, partially in schematic form:

FIG. 1: the path velocity v(s) of a robot controlled according to FIG. 2, and

FIG. 2: the sequence of a method for controlling a robot according to one embodiment of the present invention.

FIG. 2 shows the sequence of a method for controlling a robot (not shown) according to one embodiment of the present invention.

In a first step S10 various robot target positions Pi are defined, for example in the form of a list of instructions, in the present case for example as Cartesian coordinates ri and transformation matrices Ti of the TCP relative to a reference system such as a robot base reference system (Pi=[ri, Ti]).

These are used in a step S20 to generate a target path profile q(s), for example by interpolating the various robot target positions by means of spline functions in a manner not shown in further detail, and transforming these to target motor angle profiles q(s) of the drive motors of the robot. The interpolation can be defined by the instructions in the list of target positions. For example, the instruction "SPL Pi" in FIG. 2 can specify that point Pi is to be traveled to with a spline, starting from the prior position Pi−1.

To limit the Cartesian velocity of the TCP, for example to a maximum value of 250 mm/s in conformity with the standard, a maximum permissible velocity v_max_vg(s), which is plotted in FIG. 1 as a constant value with dashes and double dots, may be specified for segments or for the entire path.

Depending on the pose q of the robot, on the other hand, rotational speed limits for example in the individual axes may also result in lower permissible velocities of the TCP. Based on a dynamic model of the robot, in a step S30 a maximum permissible velocity v_max_RB(s) due to such limiting conditions may therefore be assigned to path parameter values s for the path. This is plotted in FIG. 1 with a dash-dotted line over the path parameter s, and varies depending on the path parameter s, as can be seen there.

If the robot is now to move at a constant Cartesian velocity in a certain segment of the path, for example in order to ensure a constantly uniform application of adhesive when using a robot-guided adhesive pistol with constant adhesive delivery, a corresponding option can be activated to that end in a step S40, for example by means of appropriate instructions in the list of predefined target positions (S40: "Y").

In the exemplary embodiment, the instruction "CONST VEL START=+100" indicates that 100 mm after point Pi a zone of constant velocity is to begin; the instruction "CONST VEL END=−50" indicates that this zone is to end 50 mm before point Pj. From these instructions, in step S50 the path parameter values s_A, s_E plotted in FIG. 1 with dotted lines are calculated, which correspond to the start of the constant velocity segment, shifted from Pi by 100 mm in the direction of departure, and the end of the constant velocity segment, shifted from Pj by 50 mm contrary to the direction of departure.

Then, in step S60, the minimum of all velocities v_max_RB(s) permissible there due to limiting conditions and of all velocities v_max_vg(s) permissible there due to predefinitions is calculated, as the maximum constant velocity v_maxconst for this segment [s_A, s_E]:

$$v\_maxconst = \text{Min}_{s \in [s\_A, s\_E]} \{v\_max\_RB(s), v\_max\_vg(s)\},$$

i.e., the smallest value of all velocities v_max_RB (s_A≤s≤s_E), v_max_vg(s_A≤s≤s_E) permissible in the selected path segment [s_A, s_E] due to limiting conditions and predefinitions:

$$v\_maxconst \leq v\_max\_RB(s), v\_max\_vg(s) \forall s \in [s\_A, s\_E].$$

This value is defined as the target velocity v(s) for this path segment, when the velocity along the path is determined in step S70.

If the option is not activated for a path segment (S40: "N"), then the target velocity v(s) there is determined for example by an optimizer. It can be seen in FIG. 1 that outside of the zone [s_A, s_E] the planned velocity v(s) (the solid line in FIG. 1) accordingly sometimes reaches the permissible limiting values v_max_RB, i.e., that drive limitations for example are fully utilized there, for example in order to move quickly to the start of adhesive application.

In the above simplified exemplary embodiment, for better visualization, besides the predefined maximum permissible velocity v_max_vg the only other value considered is the maximum permissible velocity v_max_RB(s) which, with the dependency of the TCP velocity $$v = v(q, dq/dt)$$

on the motor angles q, results directly from the rotational speed limitations $$\frac{dq}{dt} \le \left(\frac{dq}{dt}\right)_{max}$$

In the same way, in principle, consideration can also be given to other dynamic limiting conditions. For example, limitations of the drive moments $$-\tau_{max} \le \tau \le \tau_{max}$$

because of the relationship $$\frac{d^2s}{dt^2} = \frac{1}{2}\frac{d}{ds}\left(\left(\frac{ds}{dt}\right)^2\right)$$

with the dynamic model $$M\frac{d^2q}{dt^2} + h\left(q, \frac{dq}{dt}\right) = \tau$$

of the robot, with the mass matrix M and the vector h of the generalized forces, lead to limitations of the slope of the profile of v(s). In a variation of the above exemplary embodiment, that can be taken into account for example by choosing as the maximum constant velocity v_maxconst for the segment [s_A, s_E] the maximum constant velocity that additionally fulfills the limiting condition $$\left(\frac{dv}{ds}\right)_{min} \le \frac{dv}{ds} \le \left(\frac{dv}{ds}\right)_{max} \quad \forall s$$

which is evaluatable on the basis of the dynamic model, or which adheres to the torque limits in the drive motors. As an example of this, a velocity profile v'(s) planned in this way is plotted in FIG. 1 with dashes and double dots, wherein the TCP enters the zone of constant path speed and exits from it again with the maximum acceleration based on its drive torque limitations, resulting in a reduction of the maximum constant velocity in segment [s_A, s_E].

If the maximum permissible velocity v_max_vg is defined, possibly for certain segments, so that it is lower than the maximum velocity v_max_RB permitted there due to limiting conditions, a desired Cartesian target velocity can be defined directly in a simple manner. Otherwise the robot, when executing the motion planned according to the method according to FIG. 2, travels at the maximum velocity that is possible there due to the dynamic conditions, in particular limitations of drive moments, drive speeds, drive accelerations, etc.

REFERENCE LABELS q joint coordinates (e.g., motor or axis angles)
s path parameter
v velocity (e.g., ds/dt)

| Reference labels | |
|---|---|
| q | joint coordinates (e.g., motor or axis angles) |
| s | path parameter |
| v | velocity (e.g., ds/dt) |

The invention claimed is:

1. A computer implemented method for controlling a robotic manipulator, comprising:
   determining a target path for the robotic manipulator, the target path having a starting point and an ending point;
   determining a permissible motion value profile for the target path;
   defining a path segment within the target path, the path segment having a starting point shifted in a direction of departure from the starting point of the target path, and an ending point shifted in a direction contrary to the direction of departure from the ending point of the target path;
   determining a motion value profile for the path segment within the target path, the motion value profile based on a ranged of permitted motion values for the path segment defined by the permissible motion value profile of the target path, and further determined based on a range of permitted derivative values of the motion value profile at one or both of the starting and ending points of the path segment; and
   causing the manipulator to traverse the path segment in accordance with the motion value profile.

2. The method of claim 1, wherein the permissible motion value profile includes a motion value that is a first or higher order derivative of the position of the manipulator with respect to time.

3. The method of claim 2, wherein the position of the manipulator from which the motion value is a first or higher order derivative is either a tool center point coordinate value of the manipulator or one or more Cartesian coordinates of the manipulator's position.

4. The method of claim 1, wherein the motion value profile of the path segment is linear with respect to a path parameter.

5. The method of claim 4, wherein the motion value profile of the path segment is a constant motion value.

6. The method of claim 1, wherein the motion value profile of the path segment is an extreme value of the range of permitted motion values.

7. The method of claim 6, wherein the motion value profile of the path segment is one of a maximum of a plurality of minimum permitted values or a minimum of a plurality of maximum permitted values.

8. The method of claim 1, wherein the motion value profile of the path segment is determined based on a kinematic or dynamic model of the manipulator.

9. The method of claim 1, wherein the target path is within at least one of the working space and a joint configuration space of the manipulator.

10. The method of claim 1, wherein the target path is determined based on one or more spline functions.

11. The method of claim 1, wherein the path segment is determined based on a plurality of defined points within the target path.

12. The method of claim 1, further comprising:
    generating an alert when a determined motion value deviates from a predefined motion value.

13. The method of claim 1, wherein the path segment is a first path segment and further comprising:
    determining a second motion value profile associated with a second path segment within the target path outside of the first path segment; and
    optimizing the motion value profile based on a range of permissible motion values for the second path segment defined by the permissible motion value profile of the target path.

14. A system for controlling a robotic manipulator, comprising:
- a path generating device determining a target path for the robotic manipulator, the target path having a starting point and an ending point, the path generating device defining a path segment within the target path, the path segment having a starting point shifted in a direction of departure from the starting point of the target path, and an ending point shifted in a direction contrary to the direction of departure from the ending point of the target path;
- a path analysis device determining a permissible motion value profile for the target path and determining a motion value profile for the path segment within the target path based on a range of permitted motion values for the path segment defined by the permissible motion value profile of the target path, the permissible motion value further determined based on a range of permitted derivative values of the motion value profile at one or both of the starting and ending points of the path segment; and
- a controller controlling the robotic manipulator to traverse the target path.

15. A program product, comprising:
a non-transitory computer-readable medium; and
program code stored on the non-transitory computer readable medium and configured to control a robotic manipulator;
the program code configured to determine a target path for the robotic manipulator;
the program code further configured to determine a permissible motion value profile for the target path;
the program code further configured to define a path segment within the target path, the path segment having a starting point shifted in a direction of departure from the starting point of the target path, and an ending point shifted in a direction contrary to the direction of departure from the ending point of the target path;
the program code further configured to determine a motion value profile for the path segment within the target path, the motion value profile based on a range of permitted motion values for the path segment defined by the permissible motion value profile of the target path, and further determined based on a range of permitted derivative values of the motion value profile at one or both of the starting and ending points of the path segment; and
the program code further configured to cause the manipulator to traverse the path segment in accordance with the motion value profile.

* * * * *